United States Patent [19]

Kane et al.

[11] Patent Number: 4,578,793

[45] Date of Patent: Mar. 25, 1986

[54] SOLID-STATE NON-PLANAR INTERNALLY REFLECTING RING LASER

[75] Inventors: Thomas J. Kane, Redwood City; Robert L. Byer, Stanford, both of Calif.

[73] Assignee: The Board of Trustees of the Leland Stanford Junior University, Stanford, Calif.

[21] Appl. No.: 630,772

[22] Filed: Jul. 13, 1984

[51] Int. Cl.[4] .............................................. H01S 3/083
[52] U.S. Cl. ........................................ 372/94; 372/92; 372/50; 372/66; 372/71; 356/350
[58] Field of Search ....................... 372/50, 94, 92, 66, 372/69–71, 75, 37, 39; 356/350

[56] References Cited

U.S. PATENT DOCUMENTS

| | | | |
|---|---|---|---|
| 4,247,832 | 1/1981 | Sanders et al. | 372/94 |
| 4,271,397 | 6/1981 | Stiles et al. | 372/94 |
| 4,470,701 | 9/1984 | Smith | 356/350 |
| 4,477,188 | 10/1984 | Stiles et al. | 372/94 |
| 4,494,873 | 1/1985 | Perlmutter et al. | 372/94 |

Primary Examiner—Léon Scott, Jr.
Attorney, Agent, or Firm—Flehr, Hohbach, Test Albritton & Herbert

[57] ABSTRACT

A solid-state non-planar internally-reflecting ring laser is described including a single piece of solid state laser material which incorporates at least two mirrored surfaces oriented to change the plane of incidence of the propagating ray path to define a ray path having at least four segments defining at least two planes, when the prism is located in a magnetic field of sufficient strength, the laser will lase in a single longitudinal and transverse mode, the magnetic field decoupling the counter propagating waves.

28 Claims, 8 Drawing Figures

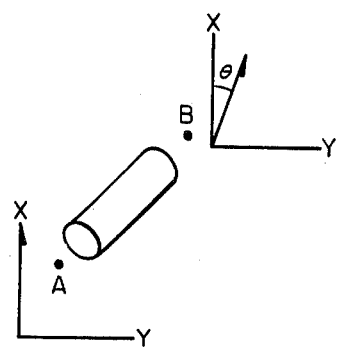
FIG_1A
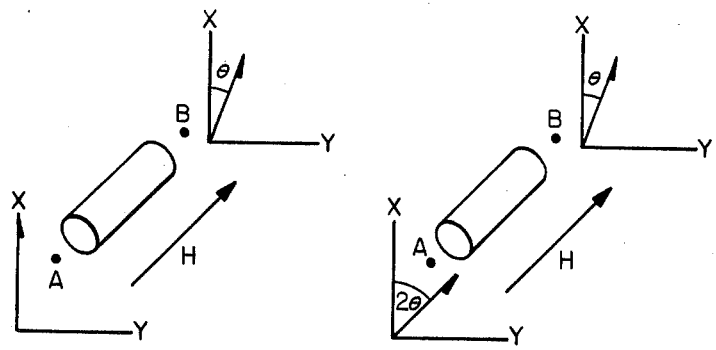
FIG_1B
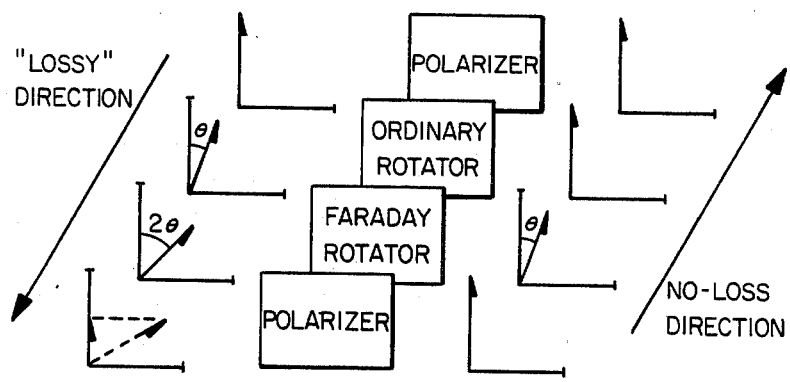
FIG_1C

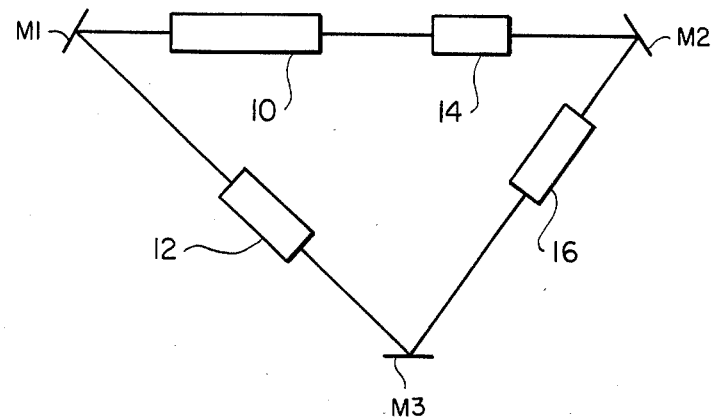
FIG_2
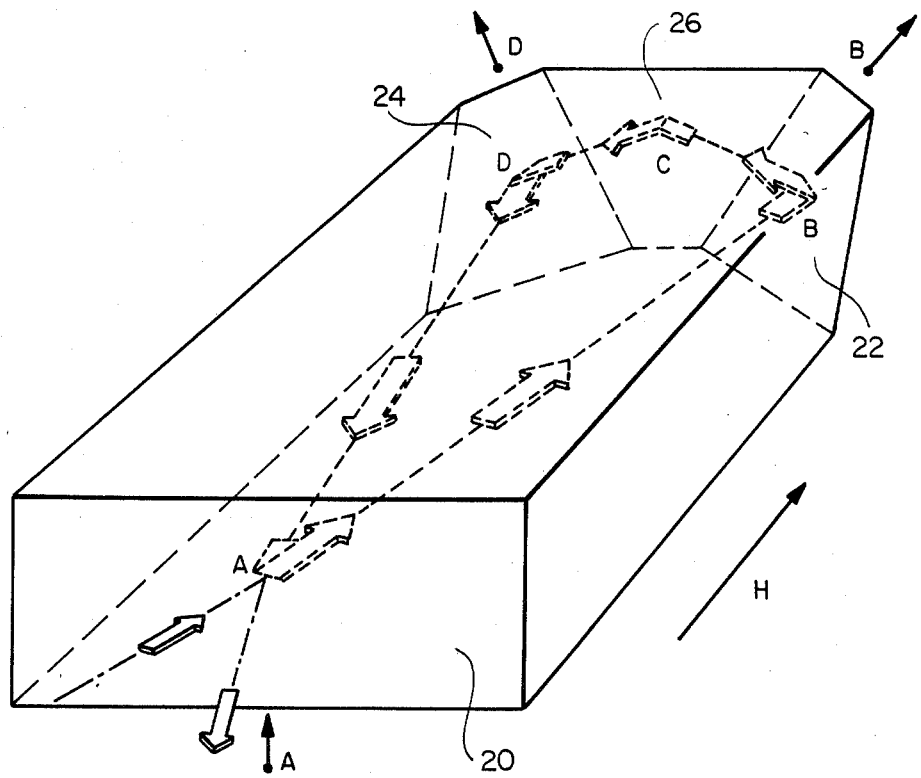
FIG_3A

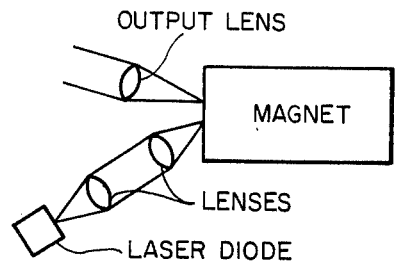
FIG_3B
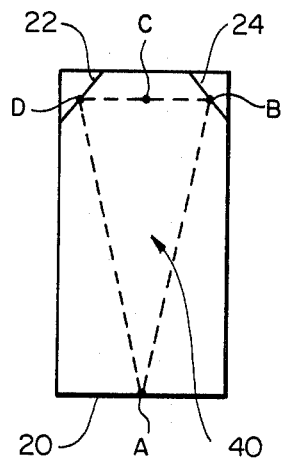
FIG_4A
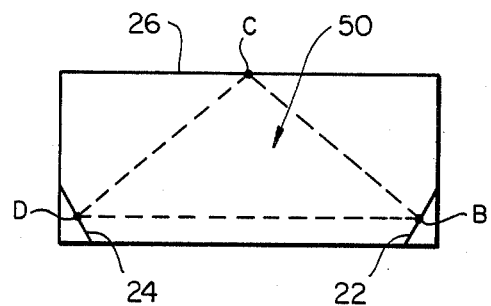
FIG_4B

SOLID-STATE NON-PLANAR INTERNALLY REFLECTING RING LASER

The present invention was developed under NASA Research Grant NAG-1-182; the U.S. Government enjoys certain rights in the disclosed invention pursuant to this grant.

This invention relates generally to ring lasers, and more particularly to solid-state ring lasers.

A principle characteristic of a ring laser, and one by which it may be distinguished from a conventional laser, is the configuration of its resonator. In a conventional laser, two highly reflecting end mirrors form a resonator of the FABRY-PEROT type, for which the normal modes of oscillation are standing waves. The resonator of a ring laser, on the other hand, is determined by the placement of at least three highly reflecting mirrors, so that the normal modes of oscillation are traveling waves whose paths trace the perimeter of a geometrical figure ("ring").

It is an objective of the present invention to provide a unique, improved solid-state ring laser.

It is a further objective of the present invention to provide a solid-state ring laser in which the ray path within the solid-state medium resonator does not lie in a single plane.

It is yet another objective of the present invention to provide a ring laser in which the ring is three dimensional.

In the prior art, solid-state ring lasers have been complex devices, containing many separate parts. This complexity has reduced their practicality. A laser resonator consisting of a single piece of solid-state laser material, with said piece also being the active laser medium, is called a monolithic laser.

It is an objective of the present invention to provide a solid-state ring laser of relatively simple construction by use of a monolithic design.

Lasers consisting of many separate parts, such as prior art solid-state ring lasers, are difficult to align properly and to maintain in alignment when the laser is moved. This mechanical instability reduces their utility. A monolithic laser, as it consists of a single piece of material, will maintain its alignment.

It is an objective of the present invention to provide a solid-state ring laser of improved mechanical stability by making use of a monolithic design.

Frequency stability is usually a desirable trait in a laser. Relative motion of the laser resonator mirrors is one of the primary causes of frequency fluctuations. When the mirrors are held fixed, the fluctuations are reduced. A laser of monolithic design, in which all mirrors are part of the same piece of laser material, may have improved frequency stability.

It is an objective of the invention to provide a solid-state ring laser with the improved frequency stability that is made possible by the monolithic design.

A further significant characteristic of the known solid-state ring lasers is that the ring laser resonator, unlike the FABRY-PEROT resonator, may support two independent counter circulating traveling wave oscillations corresponding to the two directions of traversal of the ring perimeter. Ring lasers are known to be extremely sensitive to non-reciprocal effect i.e. the two independent counter circulating traveling waves will respond differently to certain applied effects. An example of a phenomenon whose effects are non-reciprocal is the FARADAY effect, whereby a magneto optic element shows circular birefringence in the presence of an applied magnetic field.

In the absence of such non-reciprocal effects, the ring cavity may support the simultaneous oscillations of two counter-circulating travelling waves that experience the same round-trip optical loss, and thus are identical in power. However, the introduction of non-reciprocal effects leads to inequality of the two optical losses. When the difference between the two losses exceeds a certain small amount, then oscillation will occur only in the low-loss direction.

It is an objective of the present invention to combine some of the known phenomena which operate in a ring laser in a novel and unobvious manner to provide a solid-state ring laser with a single direction of oscillation.

One of the reasons that it is not easy to stabilize a laser is that light scattered back into the laser from objects outside the laser causes amplitude and frequency fluctuations of the laser. If the laser is a unidirectional ring, then the light scattered back into the laser is travelling in a direction opposite to that of the oscillating wave, and is greatly reduced as a source of fluctuations.

It is an objective of the present invention to provide a solid-state ring laser with reduced sensitivity to light scattered back into the laser resonator, by using a unidirectional ring design.

Another objective of the present invention is to provide a laser which is single mode, both longitudinally and transversely.

Single longitudinal mode oscillation, while theoretically possible, is in fact not easily achieved. Laser materials which are homogeneously broadened, such as ND:YAG, should lase easily in a single longitudinal mode theoretically, when the pumping is continuous wave (CW). However, a conventional linear resonator lases in five or more modes due to a phenomonen known as spatial hole burning. Spatial hole burning occurs when there is a standing wave in the resonator, with a sinusoidal intensity pattern. At points of low intensity, there is poor saturation of the gain and the other modes will be above threshold.

Therefore, one prior art approach for achieving single longitudinal mode operation in homogeneously broadened solid state material such as ND:YAG is to build the laser resonator as a unidirectional ring. When there is a traveling wave instead of the standing wave, there is uniform saturation of the gain and only one mode should lase. So what is needed is a ring resonator where there is slightly greater loss in one direction than the other. Such lasers have been built, but are of relatively complex construction.

It is an objective of the present invention to provide a unidirectional single mode ring laser of relatively simple construction.

Also known in the prior art is a technique for achieving single transverse mode operation by end pumping with a laser. Conventional pumping results in gain throughout the laser medium so many transverse modes will lase. An aperture is needed to select one mode. However, if the pump light is focused into the laser material in such a way that only the volume contained by the TEMoo mode is pumped, then this mode alone will lase, and witout the high losses associated with apertures. This technique of achieving single transverse mode operation by using a beam of pump light to pump the volume of only one mode is called selective end pumping. It is therefore an objective of the present invention to provide a laser that achieves single transverse mode operation through selective end pumping of the TEMoo mode.

The objectives of the present invention are achieved by an internally reflecting solid-state non-planar ring laser designed in accordance with this invention. A preferred embodiment of the invention comprises a single piece of solid state laser material with a non-planar ring path for the laser beam. The piece of laser material has four faces, including at least three fully-reflecting faces, so that a four segment path exists for the laser beam in the crystal.

If this preferred embodiment of the invention is placed in a magnetic field of adequate magnitude, and end-pumped with a beam of light of adequate power, then lasing will take place in a single direction in the ring, in a single longitudinal and transverse mode.

Because all of the resonator mirrors in the preferred embodiment are part of the monolithic piece of laser material forming a prism, the resonator and laser beam are extremely stable The non-reciprocal ring laser of the present invention defines a ring with a minimum of four sides. In a preferred embodiment, three of the corners are defined by surfaces providing total internal reflection; the fourth is the output coupler. The output coupler is at a non-normal angle of incidence and so acts as a partial polarizer. The corners at which the internal reflections take place act as birefringent elements. A magnetic field is present to cause magneto optic rotation of the direction of polarization so that while the laser ray propagates in one direction, it does not propagate in the reciprocal direction. Since the planes of incidence for the four faces are not all the same, there is effectively some non magnetic rotation of the polarization. (The plane of incidence is defined as the plane containing the incident and reflected rays at each mirror). The strength of the magnetic field and the orientation of the total internal reflection faces are such that one direction of travel sees each face in the proper orientation for a substantial amount of depolarization to take place, while the other direction is less strongly depolarized.

The output coupling takes place at a partially transmitting face of the prism. This partially transmitting face acts as a partial polarizer, and creates a lower-loss, and thus preferred, polarization for lasing. The direction of traversal of the ring which is most able to maintain this low-loss poplarization will be the direction of lasing. Thus the low-depolarization direction of the ring traversal will be the preferred direction of lasing.

The laser having a non-reciprocal ring is effectively isolated from outside reflection. Matching the pump radiation (from a mostly coherent semi-conductor diode laser or some other source) into the mode volume will result in single transverse mode of operation. Good frequency stability is possible since the natural acoustic modes of the prism are at very high frequencies which cannot propagate through the mounting hardware into the prism. Good thermal stability is also available with the present invention since the diode pumping which is used in the preferred embodiment results in little waste heat, and cooling may be done by conduction or thermo-electrically. Flowing water cooling is responsible for much of the thermal and acoustic noise in conventionally laser pumped systems. Other advantages of the present invention will become apparent to one of skill in the art who has reviewed the subject invention disclosure.

There follows below a more detailed description of the invention which when taken in conjunction with the accompanying drawings and claims will furher show how the various objects and features of the invention are realized and will at the same time illustrate numerous other advantages.

FIGS. 1a, 1b and 1c are schematic representations of the FARADAY effect which, when applied in cooperation with the non-planar ray path, results in a uni-directional ring laser.

FIG. 2 is a block diagram of a conventional ring laser as presently known in the art.

FIGS. 3a and 3b are diagrams of a prism having mirrored surfaces to provide the non-planar ray path which is critical to the non-reciprocal ring laser of the present invention.

FIGS. 4a and 4b illustrate the phenomena upon which use of the ring laser of this invention for rotation sensing is based.

An important part of the non-reciprocal ring laser of the present invention is the fact that FARADAY (magnetic) rotation of polarization, and ordinary (non-magnetic) rotation behave in an opposite manner when the direction of propagation of light is reversed. This can be used as noted above to provide a uni-directional ring laser. For ordinary rotation, the rotation of the light going through the rotator one way exactly cancels the rotation of light when it goes the other way. FIG. 1a is an example of this effect on light traveling in either direction.

In contrast, a FARADAY rotator is not reciprocal. That is, when light which has passed through the rotator is returned back through it, the rotation doubles. FIG. 1b is an example of this case. The result of this is that a FARADAY rotator combined with an ordinary rotator provides rotation of light which works to cancel the rotation for light traveling in one direction, but provides additive rotation for light traveling through the rotator in the opposite direction. When combined with two polarizers, this creates the optic diode shown in FIG. 1c. Thus an optic diode incorporated in a ring laser resonator creates a one way ring laser.

FIG. 2 shows a conventional ring laser. It consists of a gain medium 10, a resonator structure comprising mirrors M1, M2, M3, a polarizer 12 a FARADAY rotator 14, and a non-magnetic rotator 16. These elements work together as explained previously to create a round trip gain in the ring which is larger in one direction than in the other, and the ring lases in one direction only.

The present invention which is shown in exemplary form in FIG. 3 comprises a solid-state non-planar internally reflecting ring laser incorporating all the elements of the conventional laser in a single element or prism which may be a ND:YAG crystal having properly ground surfaces. The unique and simplified design includes two key elements i.e. the ray path defined in the prism is non-planar, and a magnetic field is present to provide the FARADAY effect discussed with respect to FIG. 1. Thus referring to FIG. 3, a ray path having a low loss direction of propagation a, b, c, d, a in the presence of a magnetic field represented by the arrow H is shown. The front face 20 of the prism is dielectric coated to form an output coupler. The three other faces which define the four-segment ray path preferably include the two corners 22, 24 remote from the output coupler and the top surface 26 of the prism. They are cut and polished to provide total internal reflection along a non-planar path in the segment between the two remote corners, 22, 24 and the surface 26 of the prism. They are cut to form the mirrors which rotate the plane of incidence of the reflecting ray. When the prism is in a magnetic field, the differential phase delay of total internal reflection, and the partially polarizing effect of non-normal incidence on reflective surface 20 combine to create higher loss in one direction than the other, forming an oscillator which includes an optic diode.

Considering this effect in greater detail, when light following the path A strikes the partially transmitting surface 20 the transmission will in general depend on polarization. The transmission of the so called S and P waves (the two possible polarization directions in the natural coordinate system of the reflection) will differ. The three mirrored surfces (which can be uncoated surfaces fabricated to defined angles) provide the modified plane of incidence for the incoming and outgoing ray path and provide total internal reflection to achieve lasing action. The output coupling mirror at the surface 20 is coated for appropriate reflectivity in accordance with the standard approach in the art.

The critical element of providing the uni-directional laser propagation path is to rotate the plane of incidence at the two cornered mirror surfaces 22, 24. The plane of incidence is defined as the plane containing the incident ray A-B and the reflected ray B-C.

The operation of the ring can be understood by tracking the polarization of the ring through a round trip in both directions. Considering the low loss direction or the direction of lasing which is indicated by the arrows in FIG. 3, one can assume that at the point A the polarization is vertical. This is the S polarization, defined as the polarization perpendicular to the plane of incidence. As the light propagates toward the point B, it is rotated clockwise as seen from our point of view. This rotation allows the polarization to again be substantially S oriented at point B, even though the plane of incidence at B is not the same as that at A. In other words, it is as if no rotation had taken place. The magnetic rotation was essentially cancelled by the fact that the mirror has been rotated, rotating the plane of incidence. Reflection at point C occurs after no additional rotation, since the propagation from point B to point C is perpendicular to the magnetic field. (FARADAY rotation occurs when the light is propogating in the direction of the magnetic field; as shown by the arrow H, the magnetic field is roughly parallel to the plane of the upper and lower surfaces of the prism.) At point D, the polarization is again S. After reflection by the mirrored surface 24 which again rotates the plane of incidence of the ray, it is rotated back to vertical by the magnetic field along the segment D-A. The round trip is now completed with the polarization again in the low loss S polarization so that the laser can exit at point A.

Now consider the opposite case where light is incident upon the surface 20 at the point A, but is traveling through the prism in a direction opposite to the direction shown by the arrows along the path A, B, C, D, so that the direction of propagation is now A,D,C,B,A. The beam rotates clockwise as it goes from point A to point D. Upon reaching D it is in a state of polarization that is neither S nor P. The rotations do not cancel, but add and at point B and along segment B-A the rotation is increased. (as explained above, no rotation occurs along the path D-C-B which is perpendicular to the magnetic field). The beam returns to point A in a mixed polarization rather than in the low loss S polarization. The mixed polarization sees greater output coupling at point A, so no lasing occurs.

In an exemplary embodiment, a piece of ND:YAG was cut in a design as shown in FIG. 3, and coated at surface 20 for 1 percent output coupling. When pumped by an argon ion laser, the oscillator reached threshold and operated in both directions and in five modes without a magnetic field present, as determined with a FABRY-PEROT interferometer. When placed in a permanent magnetic field of three kilogauss it oscillated in a single mode in a single direction. The output power of 50 milliwatts was limited by the power of the pumping laser.

It will be understood by one of skill in the art who has studied the above invention disclosure that the frequency stability of the design disclosed above makes possible coherent detection of laser radiation with a low band width detector which is very useful for communications. The subject embodiment will also provide a basis for high resolution spectroscopy. Another application is the measurement of the Doppler shifts of light scattered by dust carried by wind to allow for laser wind measurement. Applications where it is desired to use a laser in the way microwaves have traditionally been used could be done using this highly stable laser.

Yet another useful invention incorporating the present monolithic isolated single mode ring laser can be undestood with respect to FIG. 4. This embodiment utilizes the ring laser as a highly simplified gyroscope or rotation sensor. Considering a top view which appears in FIG. 4A of the ray path within the prism, the ray travels to the mirrored surface 22, to a point on the top surface, to the next mirrored surface 24 and then back to the output point on the surface 20. FIG. 4B is an end view of this same ray path. The area 40 shown in FIG. 4A is then highly useful for rotation sensing. If the prism of FIG. 4A is then rotated in the plane containing points ABD, the frequency at which the laser lases will change with rotation. Thus the system becomes an effective gyroscope.

It is worth noting that as the area 50 shown in FIG. 4B shrinks to zero, the bias is also reduced so that when the points D, C, B are co-planar, a uni-directional ring laser is no longer achieved. If the point C passes through the plane of rays A-C and A-D and the area 50 is now below this plane, the ring laser will lase uni-directionally in the opposite direction. It is also worth noting that referring to FIG. 4B, as the ray path is presently constructed, the magnetic field is into the surface or traveling away from the viewer. Thus the sign of the magnetic field pointing into the sheet determines the sign of the phase change. If the direction of the magnetic field is changed, then oscillation direction will switch to the other direction.

It should also be noted that at least part of the ray path can be outside of the prism, although this should be the planar portion of the path, i.e. the entry-exit portion. Therefore, for example the surface 20 could be located a distance away or separated by air from the solid state prism which incorporates the mirror reflecting surfaces, especially the surfaces 22, 24, which provide the critical function of rotating the plane of incidence of the ray to define a non-planar ray path.

Other modifications of the present invention may become apparent to one of skill in the art who has studied the subject invention disclosure. Therefore, the scope of the present invention is to be limited only by the following claims.

What is claimed is:

1. A non-planar laser resonator, comprising a single piece of solid-state laser material, reflecting means internal to said laser materials for defining a non-planar ray path in said resonator, at least two reflections taking place at internal surfaces of said piece of solid-state laser material said surfaces being oriented to change the plane of incidence of the propagating ray to produce said non-planar ray path.

2. A laser resonator as claimed in claim 1 including means for pumping said laser material.

3. A laser resonator as claimed in claim 1 including means for end-pumping said laser.

4. A laser resonator as claimed in claim 1 further including a semi-conductor diode laser for end-pumping said laser.

5. A laser resonator as claimed in claim 1 further including means for applying a magnetic field to said solid-state material to decouple counter propagating waves.

6. A laser resonator as claimed in claim 5 wherein said solid-state material comprises a single piece of ND:YAG.

7. A laser resonator as claimed in claim 5 further including a permanent magnet for applying a magnetic field to the solid-state material.

8. A laser resonator as claimed in claim 5 wherein the magnetic field is oriented substantially parallel to a portion of the ray path.

9. A laser resonator as claimed in claim 1 wherein said piece of solid-state laser material includes an output coupling mirror at one end and three or more internally reflecting surfaces spaced from the output coupling mirror and angled to direct rays in a non-planar ring path.

10. A laser resonator as claimed in claim 9 including means for applying a magnetic field to generate non-reciprocal rotation of said light beam.

11. A laser resonator as claimed in claim 9 including means for applying a magnetic field generate unidirectional lasing action.

12. A laser resonator comprising a prism of solid-state laser material, reflecting means for defining a non-planar, internal lasing ray path through said laser material, means for end pumping said solid-state laser material and means for generating a magnetic field in said laser material which decouples counter propagating waves, the strength of said magnetic field and orientation of the reflecting means causing non reciprocal lasing action within the laser material along said lasing ray path.

13. A laser resonator as claimed in claim 12 wherein said end pumping means comprises a diode laser.

14. A laser resonator as claimed in claim 12 wherein all reflections are internal to said prism of solid-state material.

15. A laser resonator as claimed in claim 12 wherein said means for applying a magnetic field comprising a permanent magnet surrounding said prism.

16. A laser resonator as claimed in claim 12 wherein said magnetic field is oriented in a direction almost to at least a portion of the parallel propagation path of said laser.

17. A laser resonator as claimed in claim 12 wherein said reflecting means comprises means for rotating the plane of incidence of the ray path.

18. A laser resonator as claimed in claim 12 wherein said laser prism includes an output coupling mirror at one end and said reflecting mirros comprise mirrored surfaces spaced from the output coupling mirror and angled to direct said rays substantially parallel to said magnetic field for non-magnetic polarization rotation of said rays.

19. A laser resonator as claimed in claim 18 wherein said mirrored surfaces are located in distant corners of said prism from said coupling mirror.

20. A laser resonator as claimed in claim 19 wherein said mirrored surfaces include polished surfaces in two corners defined by three planar surfaces of the prism.

21. A laser resonator as claimed in claim 20 further comprising a third mirrored surface in an opposite surface of the prism to the surfaces defining said mirrored corners.

22. A ring laser including a single prism of said solid-state laser material having at least three internally reflecting mirror polished surfaces and responsive to a field whereby lasing occurs in a single, non planar direction and wherein said laser prism includes an output coupling mirror at one end and said reflecting mirrors comprise mirrored surfaces spaced from the output coupling mirror and angled to direct said rays substantially parallel to said magnetic field for non-magnetic polarization rotation of said rays.

23. A ring laser as claimed in claim 22 wherein one end of said prism comprises non-normal entry and exit points for said ray path, the distal end of said rectangle having mirrored corners for rotating a plane of incidence of the rays.

24. A ring laser as claimed in claim 22 wherein said magnetic field decouples the rays propagating in a direction opposite to the single direction of laser action.

25. A ring laser as claimed in claim 22 wherein said magnetic field is substantially parallel to a plane defined by a common point of ring entry and exit in said ring laser path, and first and last mirrored portions of said prism comprising means for rotating the plane of indidence of the rays traveling between said mirrored portions and said common point.

26. A ring laser as claimed in claim 25 wherein said mirrored portions comprise means for rotating the rays plane of incidence, the path of said ray between said first and last mirrored portions and said entry/exit point being substantially parallel to said magnetic field.

27. A ring laser as claimed in claim 26 wherein said mirrored surfaces include polished surfaces in two corners defined by three planar surfaces of the prism.

28. A ring laser as claimed in claim 27 further comprising a third mirrored surface in an opposite mirrored surface of the prism to the surfaces defining said mirrored corners.

* * * * *